US010344504B2

(12) United States Patent
Dhadda et al.

(10) Patent No.: US 10,344,504 B2
(45) Date of Patent: Jul. 9, 2019

(54) LUG NUT LOCKING SYSTEMS

(71) Applicants: Bhupinder Dhadda, Puyallup, WA (US); Ickdeep Singh, Puyallup, WA (US)

(72) Inventors: Bhupinder Dhadda, Puyallup, WA (US); Ickdeep Singh, Puyallup, WA (US)

(*) Notice: Subject to any disclaimer, the term of this patent is extended or adjusted under 35 U.S.C. 154(b) by 311 days.

(21) Appl. No.: 15/284,130

(22) Filed: Oct. 3, 2016

(65) Prior Publication Data
US 2018/0094458 A1  Apr. 5, 2018

(51) Int. Cl.
| *E05B 77/44* | (2014.01) |
| *B60R 25/00* | (2013.01) |
| *B60B 7/16* | (2006.01) |
| *E05B 73/00* | (2006.01) |
| *E05B 79/02* | (2014.01) |
| *B60B 27/06* | (2006.01) |

(52) U.S. Cl.
CPC ............... *E05B 77/44* (2013.01); *B60B 7/16* (2013.01); *B60R 25/00* (2013.01); *E05B 73/00* (2013.01); *E05B 79/02* (2013.01); *B60B 27/065* (2013.01); *B60B 2320/52* (2013.01); *B60B 2900/3318* (2013.01)

(58) Field of Classification Search
CPC .......... E05B 77/00; E05B 77/44; E05B 79/02; E05B 83/00; E05B 85/00; B60R 25/00; B60R 25/08; B60R 25/09
See application file for complete search history.

(56) References Cited

U.S. PATENT DOCUMENTS

| 2,568,370 | A | * | 9/1951 | Scuderi | ..................... B60B 3/18 |
| | | | | | 301/35.52 |
| 3,135,558 | A | * | 6/1964 | Johnston, Jr. | ............. B60B 3/16 |
| | | | | | 206/335 |
| 4,161,869 | A | * | 7/1979 | Dixon | ..................... B60B 7/068 |
| | | | | | 301/37.21 |
| 6,419,326 | B1 | * | 7/2002 | Rains | ....................... B60B 7/16 |
| | | | | | 301/37.21 |
| 8,708,627 | B2 | * | 4/2014 | Davies | ................. F16B 39/101 |
| | | | | | 411/102 |
| 8,733,140 | B2 | * | 5/2014 | Jones | ........................ B60B 7/16 |
| | | | | | 188/32 |
| 8,739,585 | B2 | * | 6/2014 | Sims | ....................... B60B 3/165 |
| | | | | | 301/37.21 |
| 8,943,865 | B1 | * | 2/2015 | Bullock | .................... B60B 7/16 |
| | | | | | 292/177 |
| 9,120,446 | B2 | * | 9/2015 | Thomas | .................. B60R 25/00 |
| 9,689,180 | B2 | * | 6/2017 | Ivarsson | ................. B60B 3/165 |
| 2008/0127691 | A1 | * | 6/2008 | Castillo | .................... B60B 7/16 |
| | | | | | 70/225 |

(Continued)

*Primary Examiner* — Christopher J Boswell
(74) *Attorney, Agent, or Firm* — Mohr Intellectual Property Law Solutions, PC

(57) ABSTRACT

Lug nut locking systems, including s for securing lug nuts on a wheel of a motor vehicle comprising a frame with ratcheting apertures. In some embodiments, the device has a pair of supports that fit over the wheel's lug bolts and underneath the frame. In other embodiments, the device comprises uniquely configured securing caps that fit over the lug bolts. In still other embodiments, the device comprises a plurality of protective covers that fit over the securing caps.

19 Claims, 7 Drawing Sheets

(56) References Cited

U.S. PATENT DOCUMENTS

2015/0143859 A1* 5/2015 Beck, Jr. ............... B60R 25/01
  70/431
2015/0251488 A1* 9/2015 Hoff ..................... B60B 7/16
  301/37.21

* cited by examiner

LUG NUT LOCKING SYSTEMS

CROSS REFERENCE TO RELATED APPLICATIONS

This application claims priority to U.S. Pat. No. 6,235,928 filed on Oct. 1, 2015, which is hereby incorporated by reference for all purposes.

BACKGROUND

The present disclosure relates generally to lug nuts on the wheels of heavy vehicles. In particular, a device for securing the lug nuts on a wheel of a heavy vehicle is described.

Known lug nut locks are not entirely satisfactory for the range of applications in which they are employed. For example, existing locking lug nuts can easily break, causing serious damage to the wheel in order to remove. In addition, locking lug nut caps are cumbersome and easily damaged, either by simple wear and tear or by unauthorized individuals.

Thus, there exists a need for lug nut securing devices that improve upon and advance the design of known lug nut locks. Examples of new and useful lug nut securing systems relevant to the needs existing in the field are discussed below.

Disclosure addressing one or more of the identified existing needs is provided in the detailed description below. Examples of references relevant to lug nut locking systems include U.S. Patent References: U.S. Pat. Nos. 8,739,585; 8,708,627; 3,135,558; and Pat. App. Pub. No. 2005/0078855. The complete disclosures of the above patents and patent applications are herein incorporated by reference for all purposes.

SUMMARY

A device for securing lug nuts on a wheel of a motor vehicle comprising a frame with ratcheting apertures. In some embodiments, the device has a pair of supports that fit over the wheel's lug bolts and underneath the frame. In other embodiments, the device comprises uniquely configured securing caps that fit over the lug bolts. In still other embodiments, the device comprises plurality of protective covers that fit over the securing caps.

DETAILED DESCRIPTION

Figure 1:
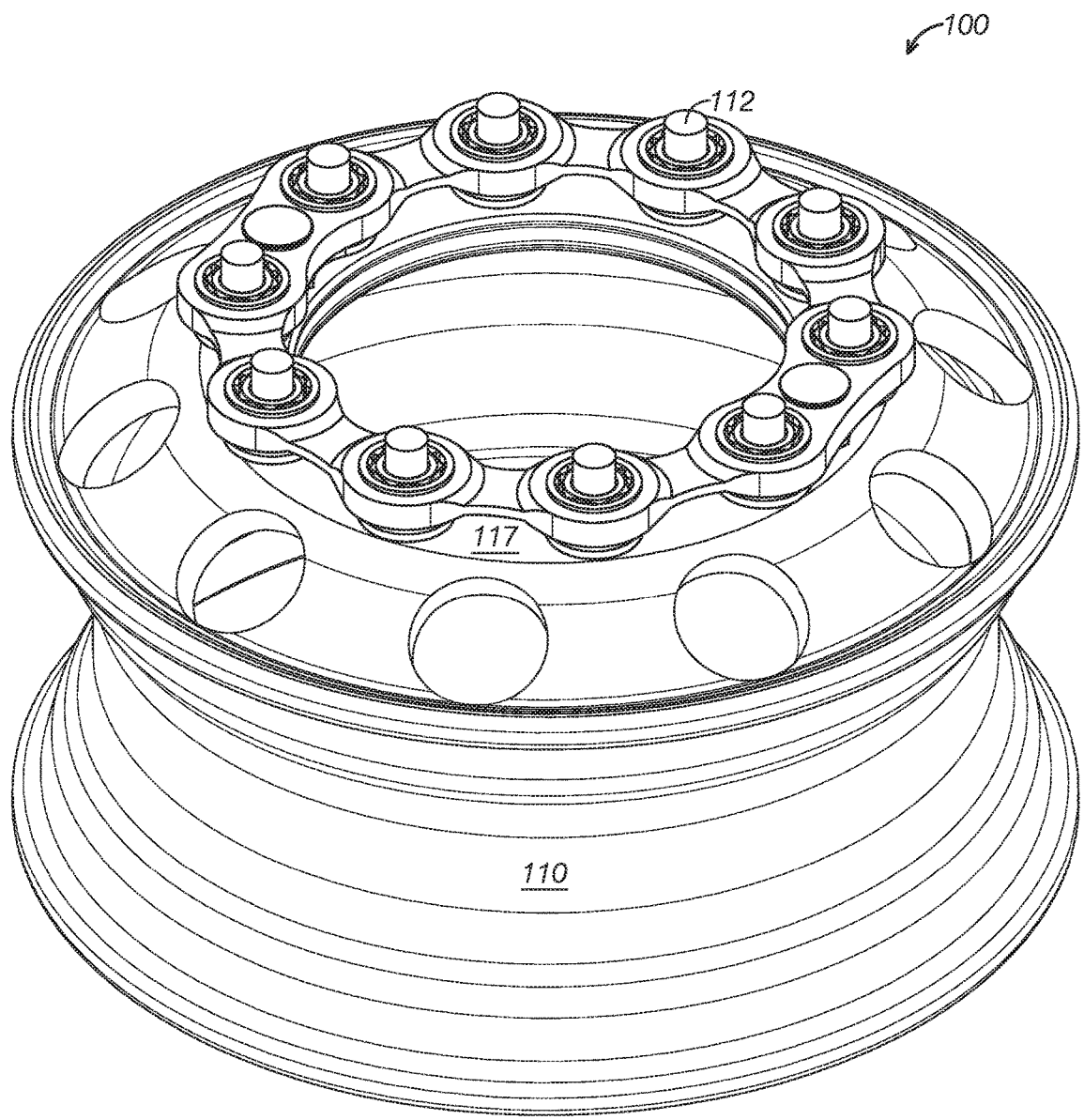
FIG. 1 is a perspective view of a first example of a lug nut securing system in use on a wheel

The disclosed lug nut securing systems will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various lug nut locking systems are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The wheels of most automobiles are typically attached using a number of threaded fasteners such as bolts or studs and an equal number of hexagonal nuts that are fastened onto the to secure the wheel. When a wheel is removed, the nuts are removed and the studs remain in the hub and the wheel is pulled away from the hub and the studs. The fasters are commonly referred to as lug bolts or lug studs and the nuts are called lug nuts. Typical heavy vehicles, such as semi-trucks, tractor trailers, busses, and the like, use wheels that have ten or twelve lug bolts or studs and nuts, while lighter passenger cars and vehicles use less.

The present invention relates to a lug nut securing system for heavy vehicles. The device comprises a frame and a pair of support bars having dimensions complementary to one another and to the dimensions of the lug nuts and lug bolts of the wheels typically used in heavy vehicles, such as semi-trucks, busses, and the like. The device is designed to complement, and work with, the existing parts of the wheel with minimal to no aftermarket modifications. It is easy to use, quick to install and remove, reliable, durable, and cheap to manufacture. It comprises a circular frame having a plurality of pass-through ratchets, where the number of pass-through ratchets is equal to the number of lug bolts on the wheel of a heavy vehicle. When user wishes to employ the device, she simply removes four factory-installed lug nuts from any or all of the wheels currently installed on a heavy vehicle and attaches the device using the parts, and in the manner as described below. When the device is installed, it functions to prevent linear movement of the lug nuts while the vehicle is moving. It also functions as a theft or sabotage deterrent when the vehicle is stationary.

With reference to FIGS. 1-10, an example of a lug nut securing system, securing system 100, will now be described. As mentioned above, securing system 100 functions to work with the existing lug bolts and lug nuts on the wheel of a heavy vehicle to prevent unintentional removal/loosening. The reader will appreciate from the figures and description below that securing system 100 addresses shortcomings of conventional lug nut locks and securing systems.

For example, securing system 100 has multiple securing mechanisms that work in concert for added stability. The shape, locations, and placement of the individual components of securing system 100 maximize friction and tension fits for added security. Further, securing system 100 works with the existing parts of the wheel does not require significant aftermarket modifications. Finally, securing system 100 is easy to install, easy to remove, easy to use, portable, reliable, durable, and cheap to manufacture.

Securing system 100 includes a frame 120, at least one support 140 having uniquely configured support nuts 142, a specialized retaining systems 170, and caps 190. In other examples, the securing system includes additional or alternative features, such as keyed lock.

Figure 7:
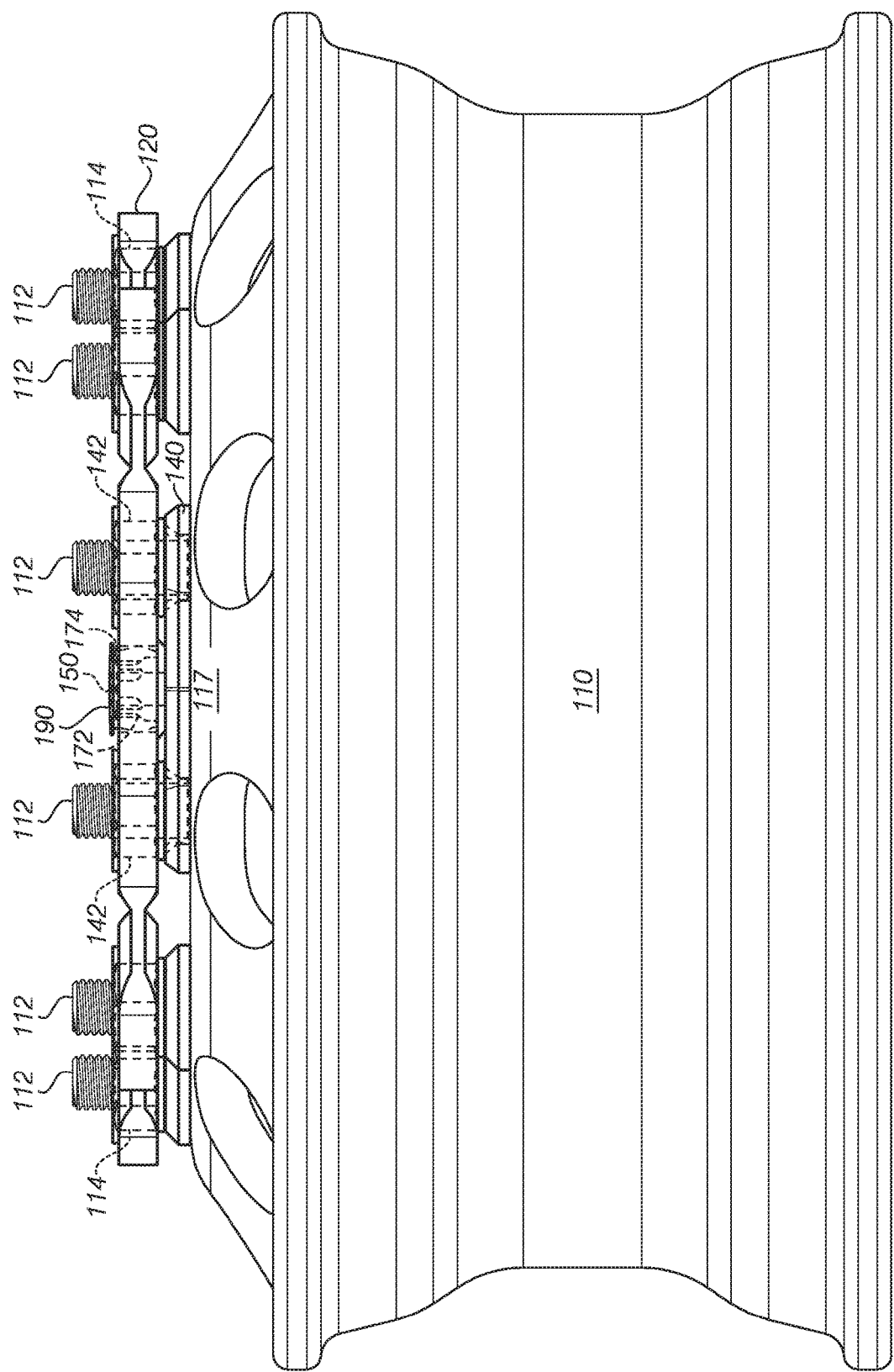
FIG. 7 is a side view of a lug nut securing system according to an embodiment of the present invention.

As can be seen in the figures, securing system 100 is designed to work with the components of a wheel used in heavy vehicles. Thus, FIGS. 1 and 7 depict wheel 110 comprising a plurality of lug bolts 112 on a disk 117 and a plurality of lug nuts 114 (shown and described in further detail in FIG. 2). As can be seen, securing system 100 is designed work with the existing components the wheel. By way of example, the figures depict wheel 110 having capable of using a number of lug bolts and lug nuts (112, 114) that is ten, however it should be understood that securing system 100 may be manufactured to work with more or less lug nuts and bolts according to the user's needs. It should further be understood that some wheels incorporate lug studs instead of lug bolts. The present invention is configured to work with any threaded fastener designed to hold a wheel in place. Thus, when the detailed description and figures refer to different nuts or bolts, it is to be understood that a preferred embodiment of the invention employs fasteners with matching male/female screw threads. Further, the reader will appreciate that the components of securing system 100 comprise aluminum. However, it is an object of the present invention that other sufficient materials may be used, such as, for example, other metals and metal alloys and other sturdy materials suitable for the invention's purpose.

Finally, while the described embodiment at the present invention is related to use in heavy vehicles such as semi-trucks and busses, in alternative embodiments (not shown) securing system may be used with light and medium duty vehicles, such as passenger cars, trucks, and the like. The reader will appreciate that it is an object of the present invention to work with any wheel having lug bolts or studs in any number, including those used in trailers and other wheeled apparatus.

Figure 2:
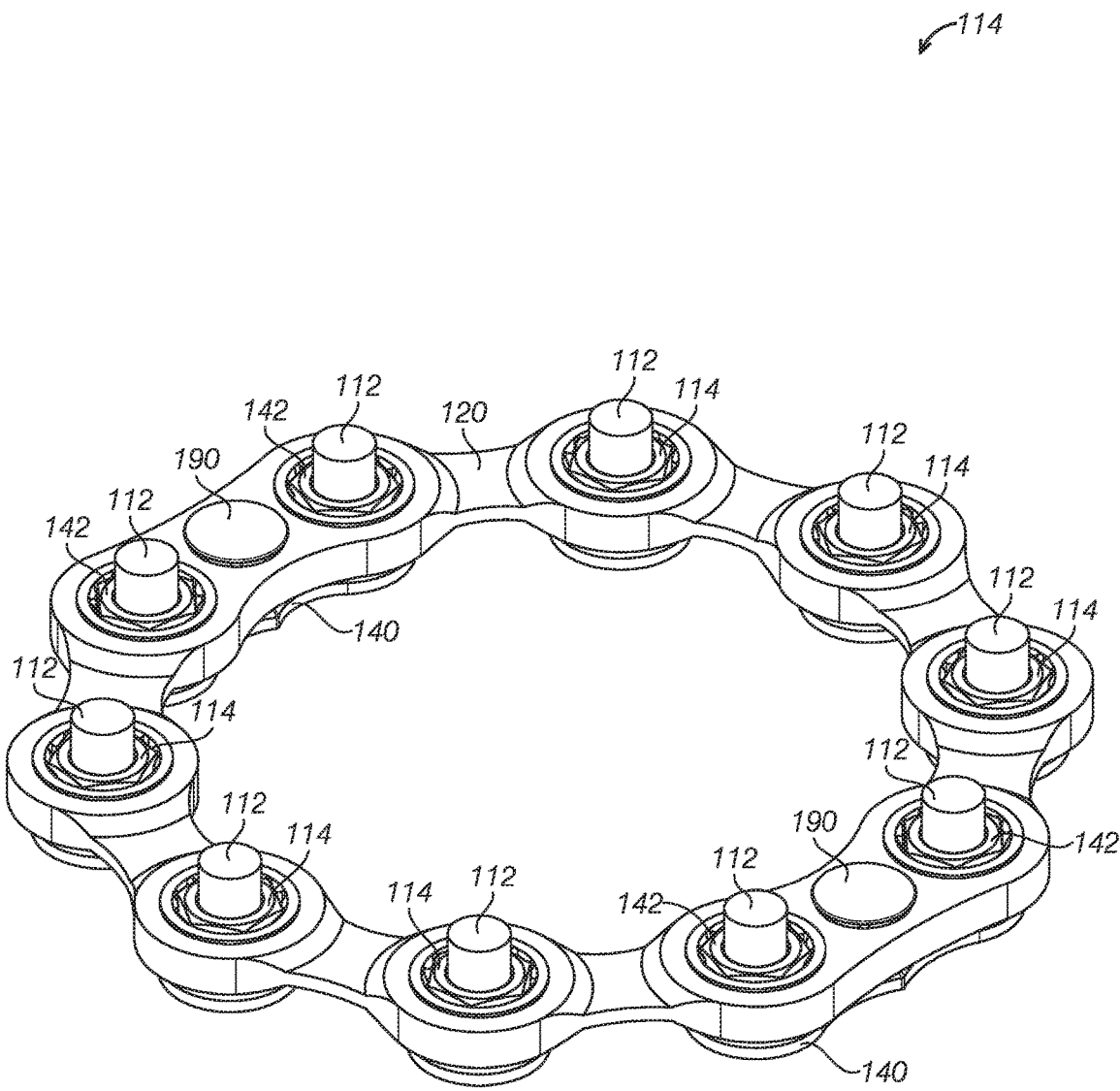
FIG. 2 is a perspective view of an embodiment of a lug nut securing system when it is not attached to a wheel.

In the example shown in FIG. 2, a perspective view of an embodiment of securing system 100 when not attached to wheel 110 is shown and described. As can be seen, the present embodiment includes ten lug bolts 112, eight lug nuts 114 and four support nuts 142 (described in further detail in FIG. 3F). Cap 190 is also shown. As mentioned above and described in further detail below, the number of lug bolts and nuts will vary depending on the type of wheel securing system is used with. Further, while the present embodiment depicts a pair of supports and their related components, the user may wish to employ additional pairs of supports according to her needs and the specifics of the wheel securing system 100 is used with.

Figure 3A:
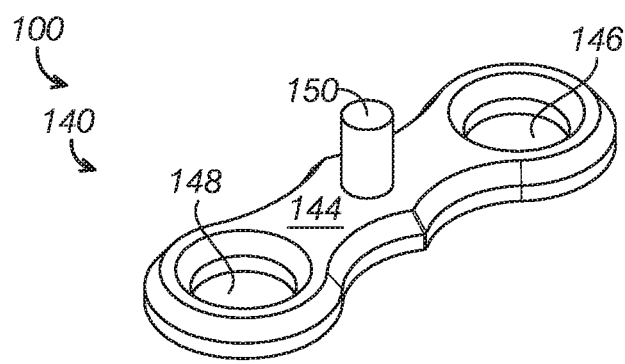
FIG. 3A is a perspective view of a support for a lug nut securing system according to an embodiment of the present invention.
Figure 3B:
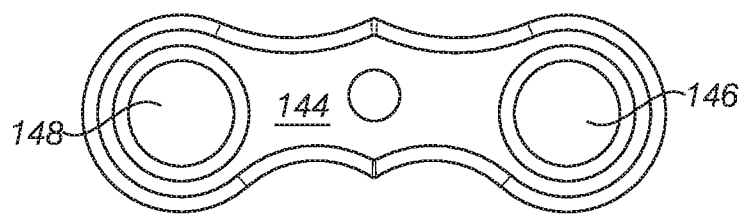
FIG. 3B is a plan view of a support for a lug nut securing system according to an embodiment of the present invention.
Figure 3C:
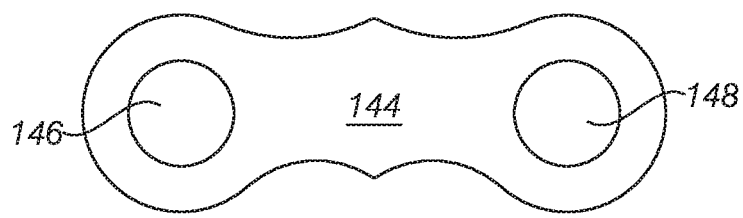
FIG. 3C is a bottom view of a support for a lug nut securing system according to an embodiment of the present invention.
Figure 3D:
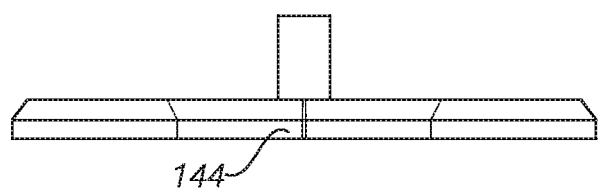
FIG. 3D is a side view of a support for a lug nut securing system according to an embodiment of the present invention.
Figure 3E:
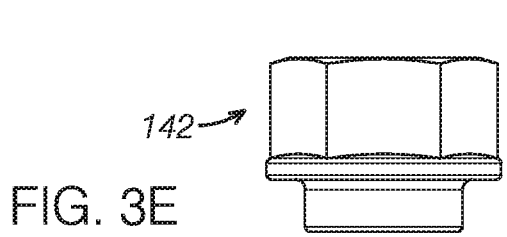
FIG. 3E is a perspective view of a support nut for a lug nut securing system according to an embodiment of the present invention.
Figure 3F:
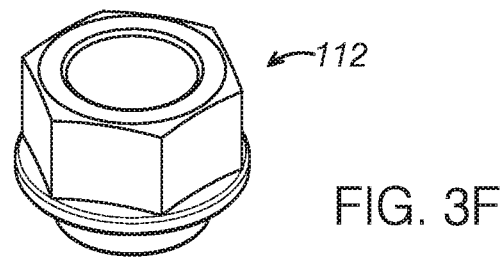
FIG. 3F is a side view of a support nut of a support for a lug nut securing system according to an embodiment of the present invention.

Referring now to FIGS. 3A-3F, multiple views of support 140 are shown and described. FIG. 3A depicts a perspective view of support 140, FIG. 3B is a plan view of support 140, FIG. 3C is a bottom view of support 140, FIG. 3D is a side view of support 140, FIG. 3E is a perspective view of support nut 142, and FIG. 3F is a side view of support nut 142. As can be seen, support 140 comprises a plate 144, which is a substantially planar surface having a first aperture 146 and a second aperture 148 on opposing ends of plate 144. Support 140 further comprises support bolt 150 located the center of plate 144 and between first aperture 144 and second aperture 144 as shown. In the present embodiment, support nut 142 comprises a hexagonal nut, however it is an object of the present invention that support nut 142 is configured to work with, and complement the dimensions and type of lug bolts and nuts of the particular wheel it is used on. Thus, in the present embodiment, the dimensions of first aperture 144 and second aperture are large enough to accommodate the lug bolts of the wheel securing system 100 is being used on, but in other embodiments (not shown) those dimensions will differ depending on the wheel type. Further, the dimensions of first aperture 144 and second aperture are complementary to the dimensions of support nut 142, which in turn, is complementary to the dimensions of lug bolt 112. In this manner, securing system 100 is designed to work with the existing components of a wheel without costly, and often unstable, aftermarket modifications.

Figure 4:
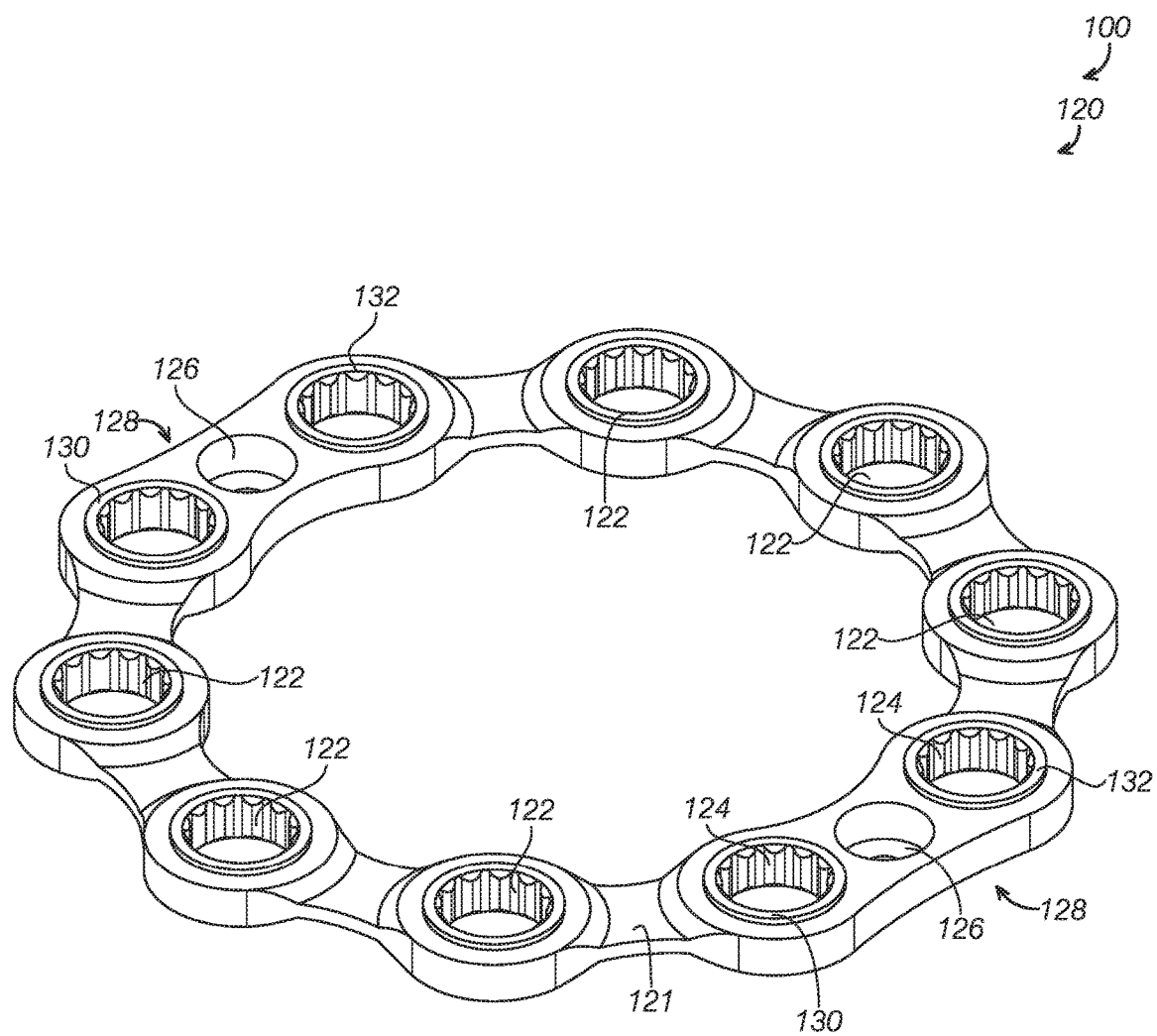
FIG. 4 is a perspective view of a frame for a lug nut securing system according to an embodiment of the present invention.

Turning attention to FIG. 4, a perspective view of frame 120 shown and described. Frame 120. In the present embodiment, frame 120 comprises a ring 121 having a plurality of frame pass-through ratchets 122 and a plurality of support pass-through ratchets 124 (described in further detail below). As can be seen, frame 120 is a substantially circular planar body that contains the pass-through ratchets to create a ring. Frame 120 further comprises support platform 128. As can be seen, support platform 128 is configured to complement the general shape of support 140. Further, frame 120 further comprises a pair of support bolt hole 126. In the present embodiment, support bolt hole 126 a circular recess located in the center of support platform 128 and is substantially between first aperture 130 and second aperture 132 as shown. By way of example, the present figure depicts the number of support platform 128 and support bolt hole(s) 126 to be two each.

Further, the present figure depicts the number of support pass-through ratchets 124 to be four, however, in alternative embodiments (not shown) the number of support pass-through ratchets 124 may vary according to the user preference. It should be understood, however, that the number of support pass-through ratchets 124 must equal the total number of first and second aperture (146, 148 respectively). That is to say, for every support 140 having first and second apertures (146, 148), there will be an equal number of frame support ratchet 124. Thus, the present embodiment depicts four support pass-through ratchet 124, and two each of first aperture 146 and two each of second aperture 148. Thus, in the present embodiment, support pass-through ratchets 124 comprise a pair of first aperture pass-through ratchet 130 and a pair of second aperture pass-through ratchets 132. The reader will appreciate that the circumference of ring 121 and the location of the pass-through ratchets corresponds to the circumference and location of lug bolts 112. The reader will further appreciate that the circumference and location of first aperture 146 and second aperture 148 correspond to the circumference and location of support pass-through ratchets 124. Finally, as alluded to in the preceding paragraphs, the circumference and location of support bolt hole 126 are complementary to the circumference and location of support bolt 150. In this manner, securing system 100 comprises layerable components, whereby support 140 is placed over two lug bolts 112 and frame 120 is placed over support 140, lug bolts 112, and lug nuts 114 (discussed in further detail below). Finally, it should be understood that support platform 128 and support 140 must be utilized in opposing pairs with the apertures positioned over diagonally opposed lug bolts as shown.

Figure 5A:
FIG. 5A is a perspective view of a securer for a support in lug nut securing system according to an embodiment of the present invention.
Figure 5A:
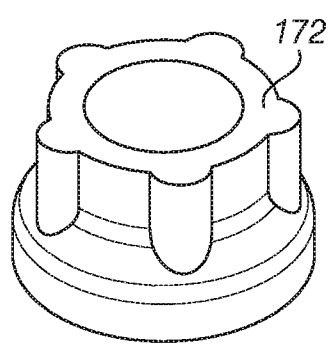
Figure 5B:
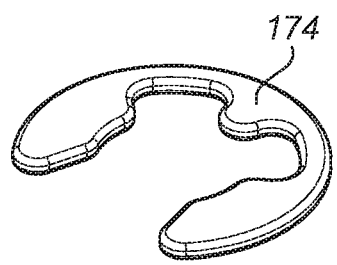
FIG. 5B is a perspective view of a washer for a support in lug nut securing system according to an embodiment of the present invention.
Figure 5C:
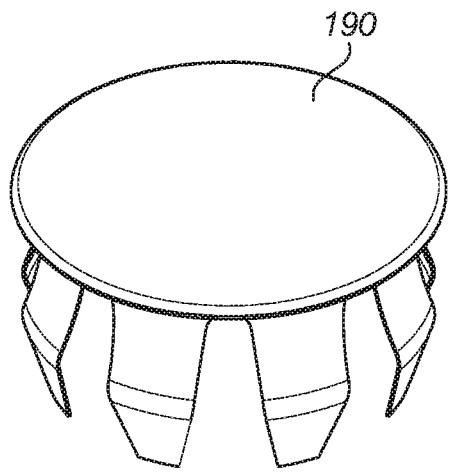
FIG. 5c is a perspective view of a cap for a support in lug nut securing system according to an embodiment of the present invention.

With reference now to FIGS. 5A-5C, perspective views of the components of retaining system 170 are shown and described. Retaining system 170 comprises center bolt securer 172, center bolt washer 174, and center bolt cap 190. As can be seen, center bolt securer 172 is a uniquely configured nut with a center aperture having a circumference that is complementary to the circumference of center bolt 150. In a preferred embodiment, the thread of center bolt securer 172 joins with the thread of center bolt 150 such that center bolt securer 172 may be tightened on to center bolt 150. In some embodiments, the user may tighten center bolt securer 172 by hand. In alternative embodiments (not shown) center bolt fastener 172 may be tightened with a uniquely configured key.

Center bolt washer 174 comprises a substantially semi-circular ring having dimensions complementary to the dimensions of the circumference of support bolt 150. Further, the vertical width of center bolt washer 174 is equivalent to the pitch of the thread of support bolt 150. In this manner, center bolt washer 174 increases the overall friction of the components of securing system 100 to prevent linear motion. When in use, center bolt washer 174 is removably coupled to support bolt 150 and on top of center bolt securer 172. Finally, center bolt cap 190 is a substantially cylindrical structure having a plurality of gripping teeth. The dimensions of center bolt cap 190 are complementary to the dimensions of center bolt securer such that is capable of being removably attached over the top of center bolt securer 172 and center bolt washer 174. In this manner, center bolt cap 190 protects retaining system 170 from dirt, wear and tear, and other environmental factors that may damage the components of retaining system 170. In alternative embodiments (not shown) cap 190 may comprise a keyed lock for added security.

Figure 6:
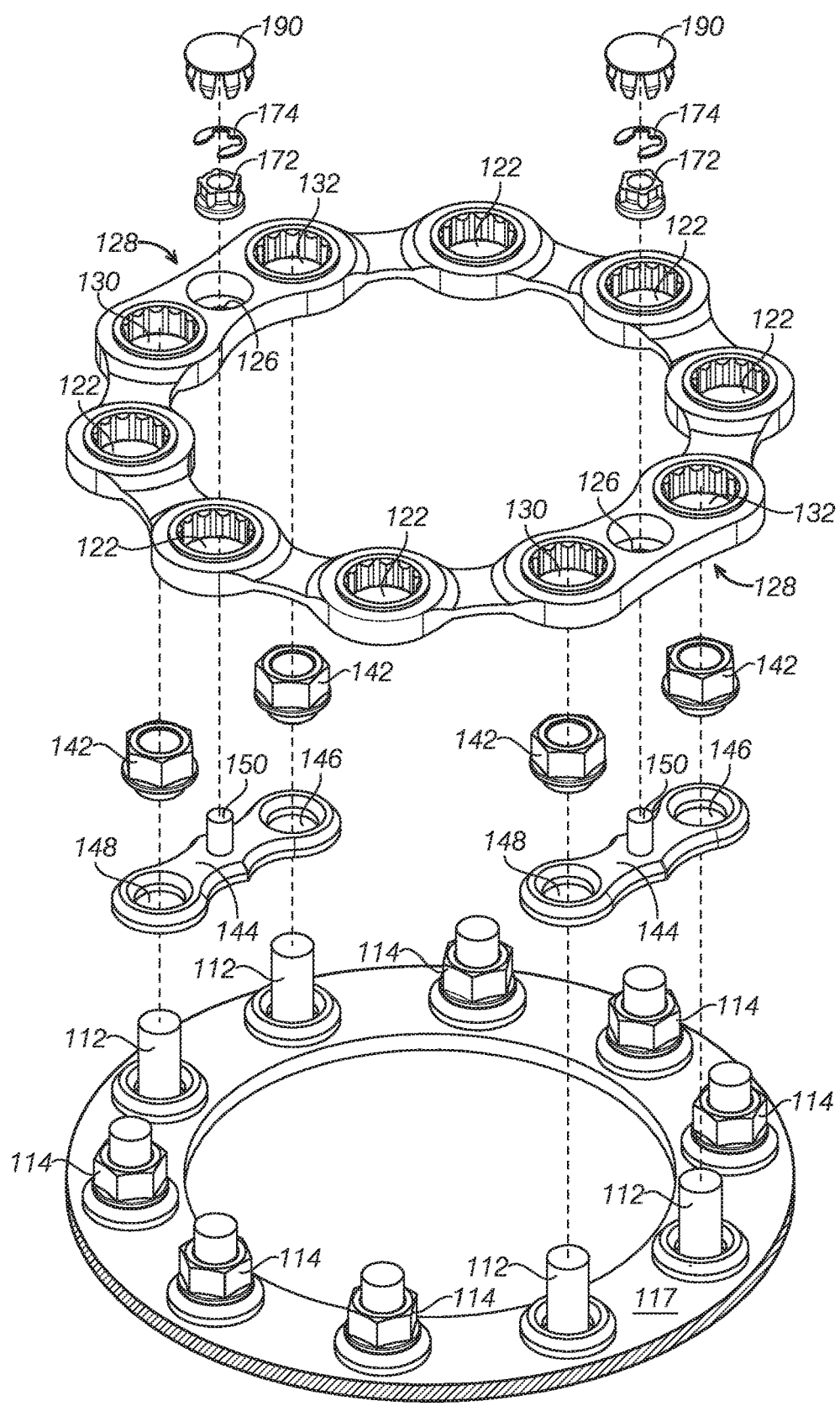
FIG. 6 is an exploded view of a lug nut securing system according to an embodiment of the present invention.

Turning attention to FIG. 6, an exploded view of securing system 100 is shown and described. As mentioned above, securing system 100 is designed to work with the existing components of the wheel of a heavy vehicle. By way of example, FIG. 6 depicts an exemplary wheel 100 with disk 117 having ten lug bolts 112 arranged in a circular pattern. Thus, on a wheel having a plurality of lug nuts and an equal number of lug bolts, the number of lug bolts equals n, and the number of lug nuts equals n. Before installing securing system 100, the user will remove four diagonally opposed lug nuts 114. This results in the number of lug bolts remaining n, and the number of lug nuts 114 being n-4, representing two pairs lug bolts that do not have corresponding lug nuts. Thus, in the example depicted in FIG. 6, disk 117 comprises ten lug bolts 112 and eight lug nuts 114.

In order to use securing system 100, the user will first place support 140 over a pair of exposed lug bolts 112 such that one lug bolt 112 passes through first aperture 146 and an adjacent lug bolt passes through second aperture 148. The user will then place a second support 140 over an opposite pair of exposed lug bolts 112 such that one lug bolt 112 passes through a second first aperture 146 and an adjacent lug bolt passes through a second second aperture 148. Similarly, support bolt 150 will pass through support bolt hole 126 on each support 140 as shown. The present example shows two support 140 in use, and it should be understood that securing system 100 requires at least one pair of supports as shown. When the supports are placed over the lug bolts in the manner described above, support 140 rests flush against the lug bolt washers on rim 117 and center bolt 150 is positioned between two lug bolts 112.

Once both supports 140 are in place, the user will then attach four support nut 142 to each exposed lug bolt 112. Thus, one support nut 142 will attach to lug bolt 112 over first aperture 146 and a second support nut 142 will attach to lug bolt 112 over second aperture 148. As mentioned above, the thread of support nut 142 is configured to pair with the thread of lug bolt 112 such that support nut 142 may be rotated down until support nut 142 tightens against lug bolt 112 and is substantially along the same horizontal plane as the remaining lug nuts 114. In this manner, support 140 is retained against each lug nut 114, and therefore, plate 117 via friction fit.

Once the supports are in place, frame 120 is attached by placing it over the lug bolts such that the plurality of frame pass-through ratchets 122 aligns with the lug nuts 114 and the plurality of support pass-through ratchets 124 aligns with the support nuts 142. In this manner, when frame 120 is in position, support platform 128 will align over support 140 as shown and the frame pass-through ratchets 122 align over lug nuts 114, and first aperture pass-through ratchet 130 is positioned over first aperture 146 while second aperture pass-through ratchet 132 is positioned over second aperture 148. The reader will also appreciate that, in the present embodiment, the number of frame pass-through ratchets 112 and the number of support pass-through ratchets 124 is proportional to the number of lug nuts 114 and lug bolts 112. Thus, while the number of lug bolts remains n, and the number of lug nuts 114 equals n-4, the number of frame pass-through ratchets 122 is also n-4, and the number of support pass-through ratchets is n-6. Therefore, the present example depicts six frame pass-through ratchets 122 and four support pass-through ratchets 124.

It should be understood that the teeth of each pass-through ratchet is complementary to the sides of the lug nuts and the support nuts. Once frame 120 is positioned over each nut, it must be locked into place to provide the security that is the object of the present invention. In order to accomplish this, the user will turn each pass-through ratchet in a clock-wise direction. This results in the sides of each nut to sit securely within its ratchet and frame 120 resting securely over each lug nut 114 and both support 140. In this manner, each lug nut 114 and each support nut 142 is securely in position within frame 120 on wheel 110 and the possibility of linear movement is eliminated.

In order to insure that frame 120 is securely fastened in place over the lug bolts, the user will then attach retaining system 170. As mentioned above, support bolt 150 has been inserted through support bolt hole 126. The user will then attach center bolt securer 172 to center bolt 150. It should be understood that, the thread of center bolt securer 172 is configured to pair with the thread of lug bolt 112 such that center bolt securer 172 may be rotated down until center bolt securer 172 tightens against lug bolt 112 and is substantially along the same horizontal plane as the remaining lug nuts 114. In this manner, frame 120 is retained against support 140, each lug nut 114 and disk 117 via friction fit.

The user will then attach center bolt washer 174 on to lug bolt 112 over center bolt securer 172 by pushing it down into place over lug bolt 112 until it rests snugly over center bolt securer 172. In so doing, center bolt washer functions to prevent linear movement of center bolt securer. Finally, the user will place center bolt cap 190 over center bolt washer 174 and center bolt securer 172 by pressing it over both such that its teeth grip the sides of center bolt securer via friction fit. In this manner, securing system 100 is locked into place over the lug nuts of a wheel.

Referring finally to FIG. 7, a side view of the assembled components of securing system 100 is shown. As mentioned above the components of securing system 100 work with the components of a wheel and are stackable on one another to provide a lug nut securing framework. Thus, as can be seen, FIG. 7 depicts one support 140 coupled to two lug bolts 112 and frame 120 positioned over support 140 and two pairs of lug nuts 114. FIG. 7 also shows center bolt cap 190 attached to center bolt 150 and covering center bolt securer 172 and center bolt washer 174. Thus, each component of securing system 100 is held against plate 117 via friction fit and each lug nut 114 is held securely in place on a wheel 110.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A device for securing lug nuts on a wheel of a motor vehicle, the wheel having a plurality of lug nuts removably coupled to a plurality of lug bolts, wherein a number of lug bolts is n, and the number of lug nuts is n−4, where n−4 comprises two pairs lug bolts that do not have removably coupled lug nuts, the device comprising:
   a frame having a plurality of turnable apertures wherein:
      the frame comprises a planar ring configured to be removably attached to the lug bolts of a wheel;
      the plurality of apertures is circumferentially positioned on the ring;
      the number of apertures in the plurality of apertures is equal to the number of lug bolts on the wheel; and
      the dimensions of each of the plurality of apertures correspond to the dimensions of each lug bolt; and
   two supports, each of the supports having a first ring, a second ring, and a center bolt, wherein:
      each of the supports is a substantially planar element and terminates in first ring on one side of the element and second ring on the opposite side of the element;
      the center bolt is on each of the supports between first ring and second ring;
      the dimensions of the first ring and second ring correspond to the dimensions of each of the plurality of apertures;
   two pairs of fasteners, wherein the dimensions of each of the plurality of fasteners correspond to the lug nuts; and
   at least two locking systems, each of the locking systems comprising a cover, a cap and a securing mechanism.

2. The device of claim 1, wherein each of the two pairs of fasteners comprises a hexagonal nut, wherein an inner circumference of each nut corresponds to dimensions of each of the plurality of the lug bolts.

3. The device of claim 1 wherein outer circumference each of the fasteners is configured to correspond to dimensions of the plurality of apertures.

4. The device of claim 1, wherein each of the plurality of apertures further comprises a pass through ratchet having a plurality of teeth, wherein dimensions of the teeth are complementary to outer edges of each hexagonal nut.

5. The device of claim 1 wherein a first pair of the pair of the two pairs of lug bolts comprises a first pair of adjacent lug bolts and a second pair of the two pairs of lug bolts comprises a second pair of adjacent lug bolts wherein the first pair of lug bolts of is diagonally opposed to the second pair of lug bolts.

6. The device of claim 5, wherein a first support of the two supports is removably attached to a first pair of lug bolts, wherein the first ring is positioned over one lug bolt in the pair and the lug bolt is inserted though first ring and wherein the second ring is positioned over a second lug bolt in the pair and the second lug bolt is inserted through second ring.

7. The device of claim 5, wherein a second support is removably attached to the second pair of lug bolts, wherein a second support first ring is positioned over a lug bolt and the lug bolt is inserted though the second support first ring and wherein a second support second ring is positioned over an adjacent lug bolt and the adjacent lug bolt is inserted through the second ring.

8. The device of claim 5, wherein the frame is positioned over the lug bolts and supports whereby the lug bolts are inserted through each of the plurality of apertures and wherein the frame rests on top of the supports.

9. The device of claim 1 wherein a first support of the two is secured to the lug bolts with a first pair of the two pair of fasteners.

10. The device of claim 9, wherein one of the locking systems is removably coupled to the center bolt by attaching the cover to the center bolt, attaching the securing mechanism to the center bolt above the cover, and covering the locking system the with the cap.

11. The device of claim 9, wherein each of the locking systems is removably coupled to the center bolt by attaching the cover to the center bolt, attaching the securing mechanism to the center bolt above the cover, and covering the each of the locking systems the with the cap.

12. The device of claim 1 wherein a second support of the tow supports is secured to a second pair of lug bolts with a second pair of the two pair of fasteners.

13. The device of claim 12, wherein the frame is secured into position over the supports and lug bolts by turning one of the plurality of apertures to bring at least one of the pairs of fasteners and lug nuts in flush with teeth of the aperture.

14. A device for securing lug nuts on a wheel of a motor vehicle, the wheel having a plurality of lug nuts removably coupled to a plurality of lug bolts, the device comprising:
   a frame having a plurality of turnable pass through ratchets, the frame comprising a planar ring configured to be removably coupled to the plurality of lug bolts of a wheel; and
   two supports, each of the two supports having a first ring, a second ring, and a center bolt between the first ring and the second ring, wherein:
      dimensions of the first ring and second ring correspond to the dimensions of each of a plurality of apertures;
      two pairs of fasteners; and
      at least two locking systems.

15. The device of claim 14, wherein each of the two pairs of fasteners comprises a hexagonal nut, wherein an inner circumference of each nut corresponds to dimensions of each of the plurality of the lug bolts and an outer circumference is configured to correspond to the dimensions to each of a plurality of ratchets.

16. The device of claim 14, wherein the first support of the two supports is removably attached to a first pair of lug bolts of the plurality of lug bolts having the lug nuts removed, wherein the first ring is positioned over a lug bolt of the first pair of lug bolts and the lug bolt is inserted though first ring and wherein the second ring is positioned over an adjacent lug bolt and the adjacent lug bolt is inserted through second ring and wherein the first support is secured to the plurality of lug bolts with a first pair of the two pair of fasteners.

17. The device of claim 14, wherein a second support of the two supports is removably attached to a second pair of lug bolts of the plurality of lug bolts having the lug nuts removed, wherein a second support first ring is positioned over a lug bolt of the plurality of lug bolts and the lug bolt is inserted though the second support first ring and wherein a second support second ring is positioned over an adjacent lug bolt and the adjacent lug bolt is inserted through second ring, and wherein the second support is secured to the second pair of lug bolts with a second pair of the two pair of fasteners.

18. The device of claim 14, wherein the frame is positioned over the lug bolts and the lug bolts are inserted through each of the plurality of apertures and wherein the frame rests on top of the supports.

19. The device of claim 18, wherein the frame is secured into position over the supports and lug bolts by turning the ratchets to bring the two pairs of fasteners and lug nuts in flush with teeth of the plurality of apertures.

* * * * *